United States Patent [19]

Lindblom et al.

[11] Patent Number: 4,585,115

[45] Date of Patent: Apr. 29, 1986

[54] ELECTRIC CLUTCH BRAKE APPARATUS

[75] Inventors: Curtis H. Lindblom; Wayne B. Martenas, both of New Holland, Pa.

[73] Assignee: Sperry Corporation, New Holland, Pa.

[21] Appl. No.: 646,986

[22] Filed: Sep. 4, 1984

Related U.S. Application Data

[63] Continuation of Ser. No. 349,435, Feb. 16, 1982, abandoned.

[51] Int. Cl.4 .......... B65G 29/00; A01D 69/06; F16D 11/00; F16H 57/10

[52] U.S. Cl. .......... 198/624; 56/11.2; 192/18 B; 74/792

[58] Field of Search .......... 198/624; 56/11.2, 10.2, 56/DIG. 1; 192/18 B; 74/792, 789, 750 R

[56] References Cited

U.S. PATENT DOCUMENTS

| | | | |
|---|---|---|---|
| 2,872,003 | 2/1959 | Nussbaumer | 192/51 |
| 3,365,865 | 1/1968 | Waldrop | 56/DIG. 1 |
| 3,375,643 | 4/1968 | McCarty et al. | 56/DIG. 1 |
| 3,377,785 | 4/1968 | Kessler | 56/DIG. 1 |
| 3,402,532 | 9/1968 | Johnston et al. | 56/DIG. 1 |
| 3,546,861 | 12/1970 | Clendenin | 56/DIG. 1 |
| 3,624,767 | 11/1971 | Kroeger | 192/18 B |
| 3,643,720 | 2/1972 | Sadler et al. | 56/DIG. 1 |
| 3,670,590 | 6/1972 | Long et al. | 56/11.2 X |
| 3,731,557 | 5/1973 | Kamlukin et al. | 74/792 |
| 4,049,207 | 9/1977 | Storm et al. | 241/101.7 |
| 4,073,377 | 2/1978 | Stoessel et al. | 198/624 |
| 4,138,837 | 2/1979 | Love | 56/11.2 |
| 4,218,864 | 8/1980 | Allemeersch et al. | 56/11.2 |

FOREIGN PATENT DOCUMENTS

| | | | |
|---|---|---|---|
| 923895 | 1/1955 | Fed. Rep. of Germany | 192/18 B |
| 422941 | 7/1947 | Italy | 192/18 B |
| 423243 | 7/1947 | Italy | 192/18 B |

*Primary Examiner*—Rodney H. Bonck
*Assistant Examiner*—Stephen B. Andrews
*Attorney, Agent, or Firm*—Larry W. Miller; Darrell F. Marquette; Frank A. Seemar

[57] ABSTRACT

In order to avoid undesirable delays in response time for controlling feed roll directional rotation and stopping, an electric clutch-brake planetary gear device provides stop, forward and reverse control of the feed rolls. The device functions as an electric clutch for a forward mode and as an electric brake for a reverse mode. Almost instantaneous shut down is available which is desirable for use in combination with a metal detector.

7 Claims, 3 Drawing Figures

10
11
12
13
14
16
18
20
22
24
26

ELECTRIC CLUTCH BRAKE APPARATUS

This application is a continuation of application Ser. No. 349,435, filed Feb. 16, 1982, now abandoned.

BACKGROUND OF THE INVENTION

This invention relates generally to solid material communition and, more particularly, to apparatus for controlling forward and reverse drive of forage harvester feed rolls.

Mechanical drive devices have been used to control rotation of feed rolls. More recently two sets of friction discs have been used in a clutch-brake device. The discs operated in oil and were controlled by electro-mechanical means to engage and disengage.

A limitation of such arrangements is disc wear and an excessive number of parts. Also, the wear problem eventually can cause torque changes which require adjustment and eventual replacement. Furthermore, since the advent of metal detectors used in forage harvester feed rolls, it is absolutely necessary to quickly stop the feed rolls when metal is detected. Therefore, response time delays normally associated with mechanical and electro-mechanical devices should be avoided.

The foregoing illustrates limitations of the known prior art. Thus, it is apparent that it would be advantageous to provide an alternative directed to overcoming one or more of the limitations as set forth above. Accordingly, a suitable alternative is to provide an electric clutch-brake apparatus for forage harvester feed rolls.

SUMMARY OF THE INVENTION

In one aspect of the present invention, this is accomplished by providing an electric clutch-brake apparatus including an input operably interconnected with an output via a planetary gear device. The gear device is operably interconnected with an armature disposed between an electrically actuated clutch magnet and an electrically actuated brake magnet.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
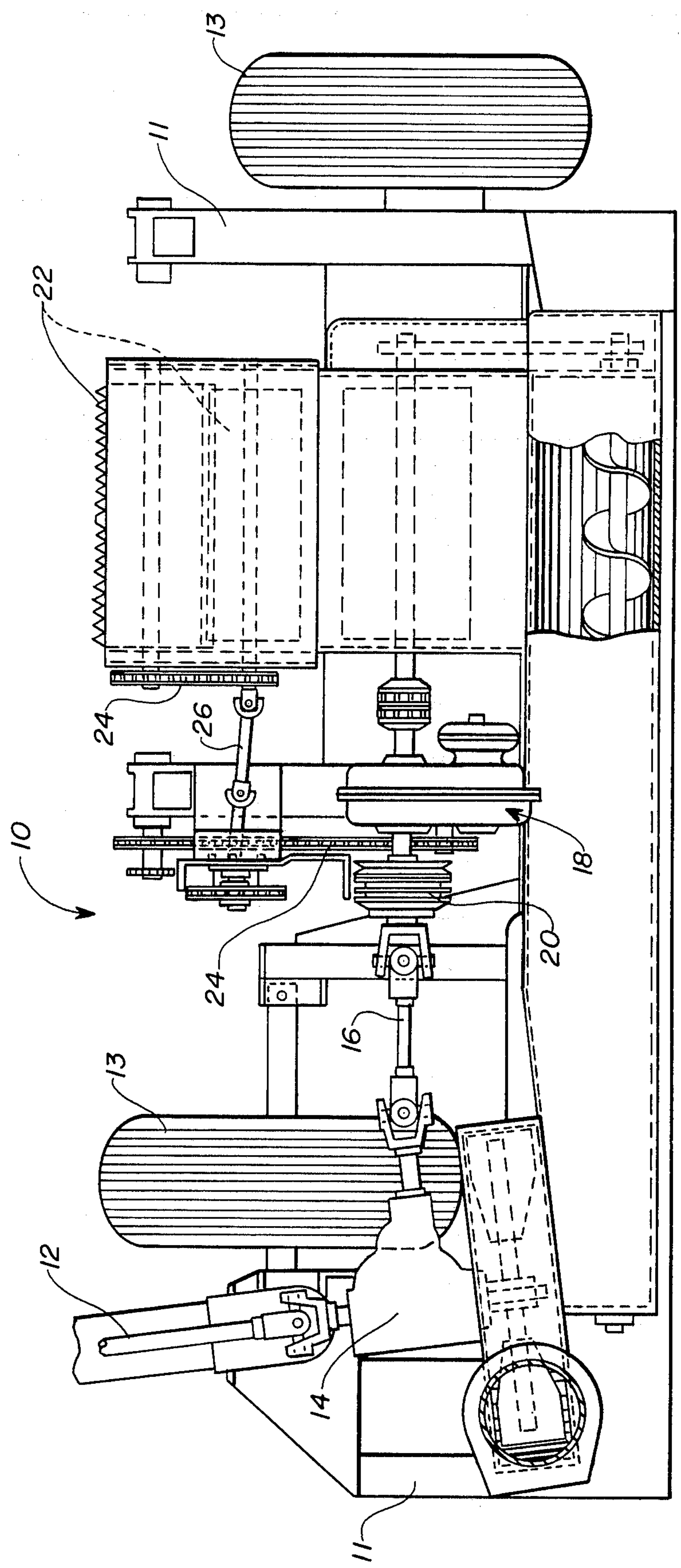
FIG. 1 is a top view illustrating an embodiment of a pull-type forage harvester in combination with the present invention.

In FIG. 1, an exemplary pull-type forage harvester is designated 10 and is mounted on a mobile frame 11 having wheels 13. Harvester 10 includes a well known power take-off (PTO) shaft 12 which receives power from a towing vehicle (not shown) shuch as an agricultural tractor. Usually, the PTO provides input at 1000 rpm to a main gearbox 14 which is reduced to an 850 rpm output provided at a shaft 16. A reversing gearbox 18 is driven by shaft 16 through a clutch and overruning clutch group 20. Output from reversing gearbox 18 provides directional rotation to feed rolls 22 via chain drives 24 and a shaft 26.

Figure 2:
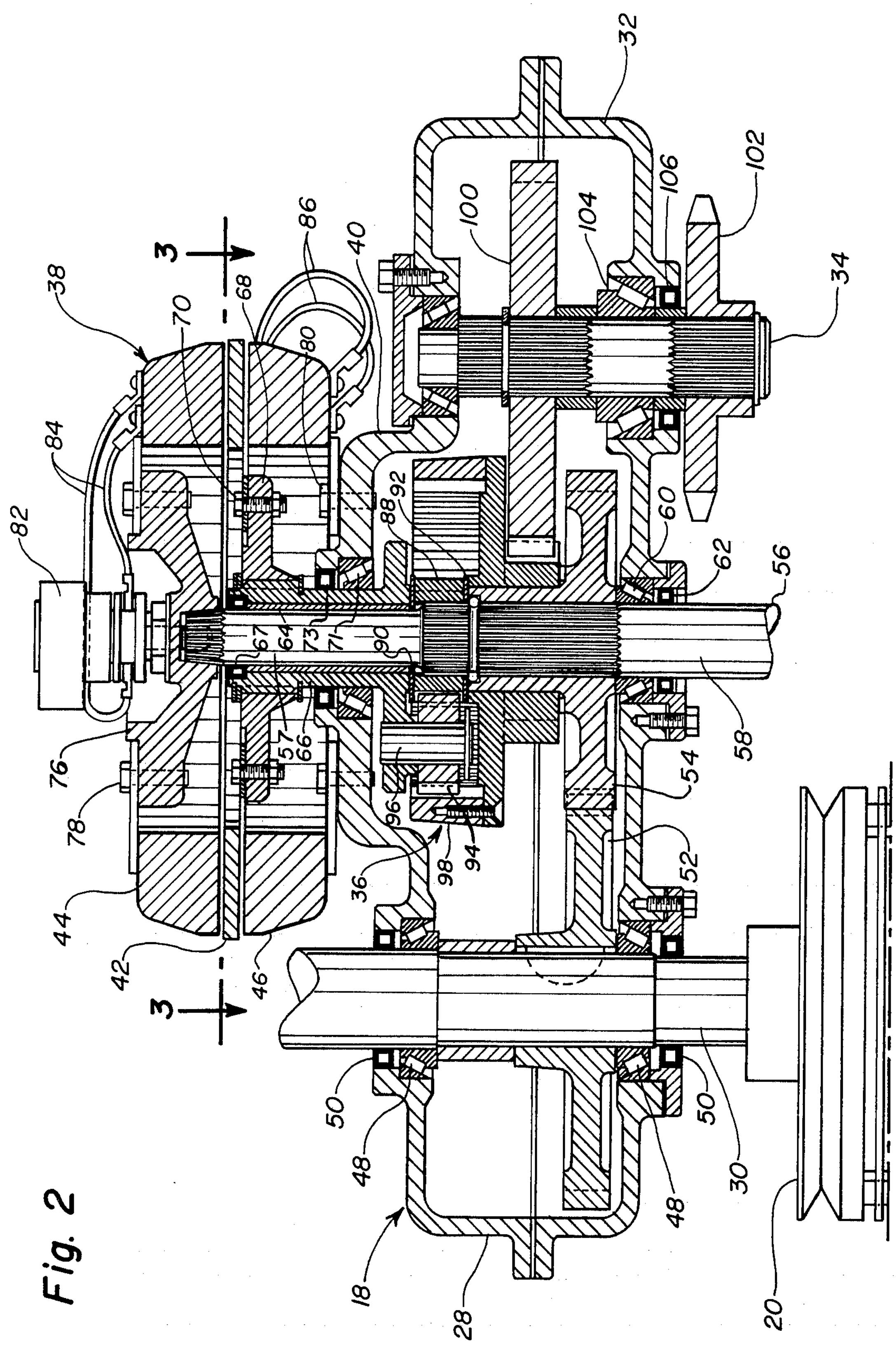
FIG. 2 is a cross-sectional top view illustrating an embodiment of the present invention.

Reversing gearbox 18, FIG. 2, comprises an input portion 28 having an input member such as a shaft 30 driven by shaft 16 via clutch group 20, an output portion 32 having an output member such as a shaft 34 and means, such as a planetary gear set 36, operably interconnected with input member 30 and the output member 34 for providing a forward mode, a reverse mode and a neutral mode to feed rolls 22 via output member 34, chains 24 and shaft 26. An electric clutch-brake device 38, operably interconnected with gear set 36, is mounted on a housing 40 of gearbox 18 and includes an armature 42 disposed between an electrically actuated clutch magnet 44 and an electrically actuated brake magnet 46.

Figure 3:
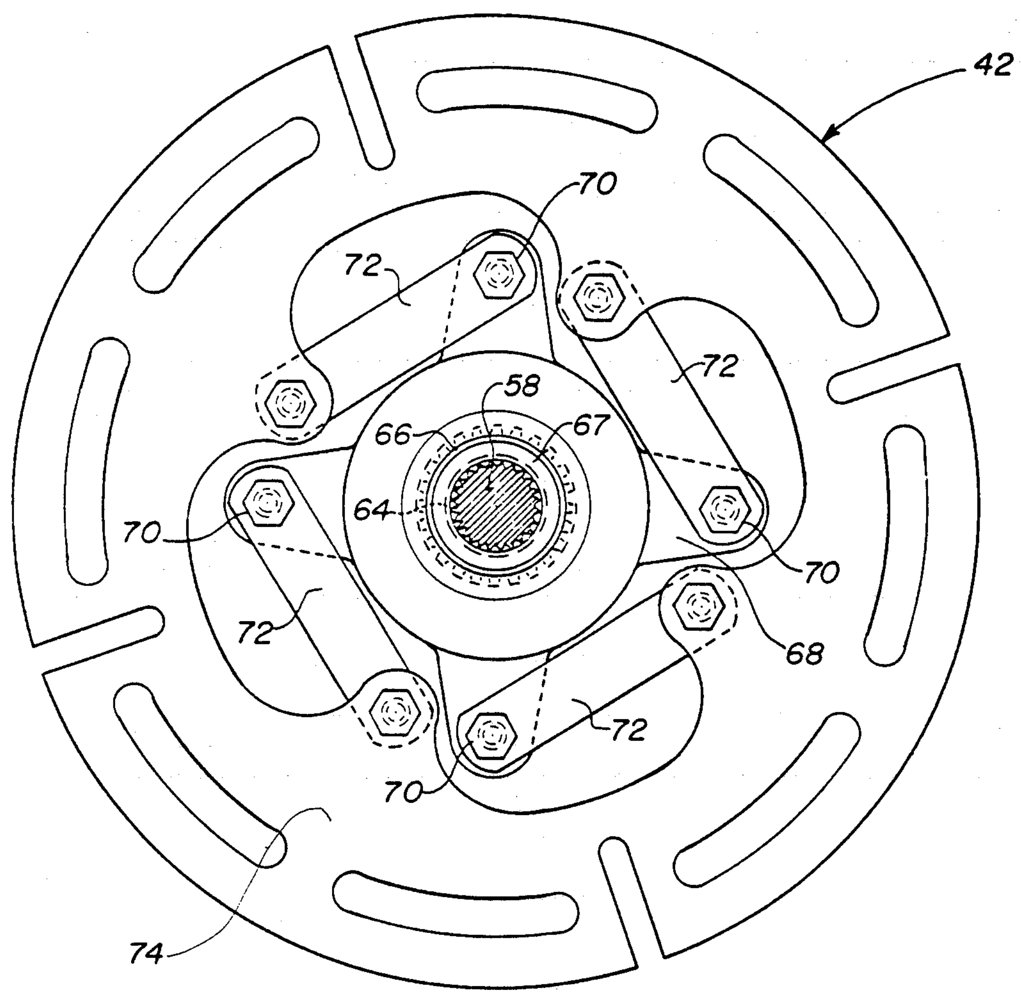
FIG. 3 is a view illustrating an embodiment of the armature of this invention taken along the line 3—3 of FIG. 2.

Shaft 30 is preferably of steel and is mounted for sealed clockwise rotation in housing 40 by suitable bearings 48 and seals 50. A steel gear 52 is keyed on shaft 30 and meshes with a steel gear 54 splined adjacent one end 56 of a steel jack shaft 58 mounted for sealed counterclockwise rotation in housing 40. by suitable bearings 60 and seals 62. Another end 57 of detachably shaft 58 extends from housing 40 and is rotatable within a bushing 64 which carries a planet carrier 66 splined to a hub 68. Carrier 66 is sealed on shaft 58 by suitable seals 67. Armature 42 is mounted for rotation with planet carrier 66 and hub 68 via bolts 70. Carrier 66 is rotatably mounted for sealed rotation in housing 40 by suitable bearings 71 and seals 73. A plurality of spring steel leaf springs 72 are connected betweedn hub 68 and a fabricated steel armature plate 74, see FIG. 3, for maintaining armature 42 normally spaced from clutch magnet 44 and brake magnet 46. Clutch magnet 44 is mounted on a hub 76 by bolts 78 to permit a disassembly and/or removal of the magnet 44 from the housing 40 without the need to access the interior of the housing 40. Hub 76 is splined on shaft 58. Magnet 44 is a commercially available model number I-5305-631-019 manufactured by Warner Electric Clutch and Brake Company. Brake magnet 46 is concentrically mounted on the end 57 of the jack shaft 58 to permit the shaft 58 to rotate relative to the magnet 46, which in turn is detachably affixed to the housing 40 by bolts 80. Magnet 46 is the same commercially available part as magnet 44. A well known brush holder 82 is provided on clutch-brake device 30 to interconnect electrical power from the towing vehicle to clutch magnet 44 via wires 84. Brush holder 82 is commonly used to connect electrical wires between a stationary part and a rotating part. One skilled in the art will readily realize that the electric cluth-brake device 38 can be easily accessed externally of the housing 40 without dismantling the reversing gearbox 18 to permit convenient service and/or replacement with respect to the entire device 38 or its individual components.

A sun gear 88 is also splined on shaft 58 and is separated from carrier 66 by a thrust washer 90 and from gear 54 by another thrust washer 92. A planet gear 94, rotatably mounted on carrier 66 by pin 86, is intermeshed between sun gear 88 and a ring gear 98. A gear 100, splined on shaft 34, intermeshes with ring gear 98. A sprocket 102 is splined on shaft 34 as a means for providing drive to chains 24 and shaft 26. Shaft 34 is rotatably mounted and sealed on housing 40 by suitable bearings 104 and seals 106.

With the parts assembled as set forth above, it can be seen that input shaft 30 always drives shaft 58 in a counterclockwise direction. As a result, clutch magnet 44 normally rotates counterclockwise with shaft 58. Brake magnet 46 remains stationary due to being secured on stationary housing 40. Further, sun gear 88 continuously rotates counterclockwise with shaft 58.

In the neutral mode, shaft 34, gear 100 and sprocket 102 are not rotating thus ring gear 98 is stationary. Planet gear 94 rotates about pin 96 in a clockwise direction and simultaneously revolves counterclockwise around sun gear 88 with carrier 66. Sun gear 88 continues to rotate counterclockwise with shaft 58. Due to the relation of the gears, armature 42 rotates counterclockwise at about two-thirds the rotational speed of shaft 58 which constantly rotates. Armature 42 is maintained spaced from clutch magnet 44 and brake magnet 46 by leaf springs 72.

In the forward mode, clutch magnet 44 is electrically actuated. Armature 42 is magnetically urged into engagement with clutch magnet 44 and rotates counterclockwise with shaft 58 and carrier 66. Sun gear 88 and ring gear 98 also rotate counterclockwise. Thus, planet gear 94 does not rotate about pin 66 but revolves around sun gear 88 with carrier 66. As a result, shaft 34, gear 100 and sprocket 102 rotate clockwise.

In the reverse mode, brake magnet 46 is electrically actuated. Armature 42 is magnetically urged into engagement with stationary brake magnet 46. Thus, rotation of armature 42 and carrier 66 are arrested and shaft 58 continues to rotate within bushing 64. Planet carrier 66 is also stationary but sun gear 88 rotates counterclockwise. As a result, planet gear 94 rotates clockwise on pin 96 but gear 94 does not revolve around sun gear 88 due to stationary carrier 66. Thus, ring gear 98 rotates clockwise and drives shaft 34, gear 100 and sprocket 102 counterclockwise.

The foregoing has described an electric clutch-brake apparatus for controlling directional rotation of forage harvester feed rolls.

It is anticipated that aspects of the present invention, other than those specifically defined in the appended claims, can be obtained from the foregoing description and the drawings.

Having thus described the invention, what is claimed is:

1. A forage harvester comprising:
- a mobile frame;
- a power takeoff shaft connected to said frame;
- a main gearbox connected to said power takeoff shaft;
- a pair of feed rolls rotatably supported by said frame and driveable in forward and reverse directions;
- a reversing gearbox having a housing supported on said frame and connected to said feed rolls and said main gearbox, said reversing gearbox being operable to drive said feed rolls in both said forward and reverse directions, said reversing gearbox including a planetary gear set having a sun gear mounted on a jack shaft for rotation therewith, a planet gear supported by a carrier for rotation independently of said jack shaft about said sun gear in intermeshing engagement therewith, and a ring gear intermeshed with said planet gear and supported on said jack shaft for rotation independently thereof, said jack shaft and said carrier extending outwardly of said reversing gearbox housing; and
- an electric clutch-brake apparatus supported on the portion of said jack shaft extending outwardly from said housing for operative association with said planetary gear set to effect an operation of said planetary gear set for selectively causing a driving of said feed rolls in said forward and reverse directions, said electric clutch-brake apparatus including an electrically actuated brake magnet detachably connected to said reversing gearbox housing, an electrically actuated clutch magnet detachably connected to said outward portion of said jack shaft for rotation therewith in spaced relationship to said brake magnet, and an armature detachably connected to said carrier for rotation therewith between said brake magnet and said clutch magnet in spaced relationship thereto, said armature being selectably attracted to said brake and clutch magnets upon electrical actuation thereof.

2. The forage harvester of claim 1 wherein said reversing gearbox includes an input shaft connected to said main gearbox to transfer rotational power from said power takeoff shaft to said reversing gearbox and an output shaft drivingly connected to said feed rolls to deliver rotational power thereto, said planetary gear set being operable to transfer rotational power from said input shaft to said output shaft.

3. The forage harvester of claim 2 wherein said sun gear is rotatably driven with said input shaft, said electric clutch-brake apparatus being positioned such that said planet gear rotates with said sun gear when said armature is attracted to said clutch magnet to drive said feed rolls in said forward direction.

4. The forage harvester of claim 3 wherein said planet gear is rotatable about a position fixed relative to said housing when said armature is attracted to said brake magnet to drive said feed rolls in said reverse direction.

5. The forage harvester of claim 4 wherein said armature is positionable in a neutral position, unattracted by either said clutch magnet or said brake magnet, said planet gear being rotatable about said sun gear without driving said ring gear and transferring rotational power to said feed rolls.

6. The forage harvester of claim 5 further including resilient means for urging said armature into said neutral position.

7. The forage harvester of claim 6 wherein said carrier supports a pin for rotatably mounting said planet gear, said planet gear being rotatable about a first axis defined by said pin and a second axis defined by said jack shaft.

* * * * *